United States Patent [19]

Kerivan

[11] 4,222,160
[45] Sep. 16, 1980

[54] METHOD OF MAKING HEAT EXCHANGE TUBING ASSEMBLY

[75] Inventor: Leo J. Kerivan, Wellesley, Mass.

[73] Assignee: Industrial Blast Coil Corporation, South Easton, Mass.

[21] Appl. No.: 900,520

[22] Filed: Apr. 27, 1978

Related U.S. Application Data

[62] Division of Ser. No. 781,925, Mar. 28, 1977, abandoned.

[51] Int. Cl.³ .............................................. B23P 15/26
[52] U.S. Cl. ........................... 29/157.3 A; 113/118 A; 165/183
[58] Field of Search .................. 29/157.3 A, 157.3 B, 29/157.3 AH; 165/177, 181, 183, 184, 150; 113/118 B, 118 V, 118 A, 118 R

[56] References Cited

U.S. PATENT DOCUMENTS

| 754,195 | 3/1904 | Bullard | 113/118 A |
|---|---|---|---|
| 851,977 | 4/1907 | Bigsby et al. | 29/157.3 A |
| 2,286,271 | 6/1942 | Higham | 165/150 |
| 2,363,224 | 11/1944 | Bronander | 29/157.3 A |
| 2,400,737 | 5/1946 | Brown, Jr. | 29/157.3 A |
| 2,778,610 | 1/1957 | Bruegger | 113/118 A |
| 3,145,456 | 8/1964 | Johnson | 29/157.3 |
| 3,360,040 | 12/1967 | Kritzer | 165/181 |
| 3,368,615 | 2/1968 | Brown et al. | 165/184 |
| 3,457,756 | 7/1969 | Rhode | 165/183 |
| 3,537,516 | 11/1970 | Kunz | 29/157.3 B |
| 3,886,639 | 6/1975 | Pasternak | 29/157.3 |

Primary Examiner—Francis S. Husar
Assistant Examiner—V. K. Rising
Attorney, Agent, or Firm—Parmelee, Johnson, Bollinger & Bramblett

[57] ABSTRACT

An improved heat exchange tubing and blade assembly and a method for fabricating the same are described. The heat exchange assembly comprises an elongated tube and an elongated heat exchange blade strip positioned thereon, said strip including an array of integrally formed blade segments which extend from a U-shaped support segment. Surfaces of the blades extend at a favorable angle of attack to the incident fluid flow stream, and in a preferred embodiment the chords of the blades extend substantially normal to the length of the tube. The strip is supported on an outer surface of the tube, and means integrally formed with the tube maintain the support segment in thermal contact with the tube. In a preferred embodiment, the tube has a generally streamlined oval cross section for utilization in heat exchanger apparatus such as air conditioner, refrigerator or heat pump, with the tubing arranged such that the minor axis of the oval extends perpendicular to external fluid flow and its major axis extends parallel therewith for reducing frictional drag and reducing stagnant regions of external fluid flow. Multiple blades fan out from opposite sides of the oval tubing along its two gently curving arcuate faces where fluid flow is relatively unimpeded. The individual blades in a preferred embodiment are tapered, decreasing in thickness from root to tip, thereby reducing mass and weight of thermally conductive material in the blade strips while providing suitable thermal conduction and mechanical strength in individual blades.

15 Claims, 30 Drawing Figures

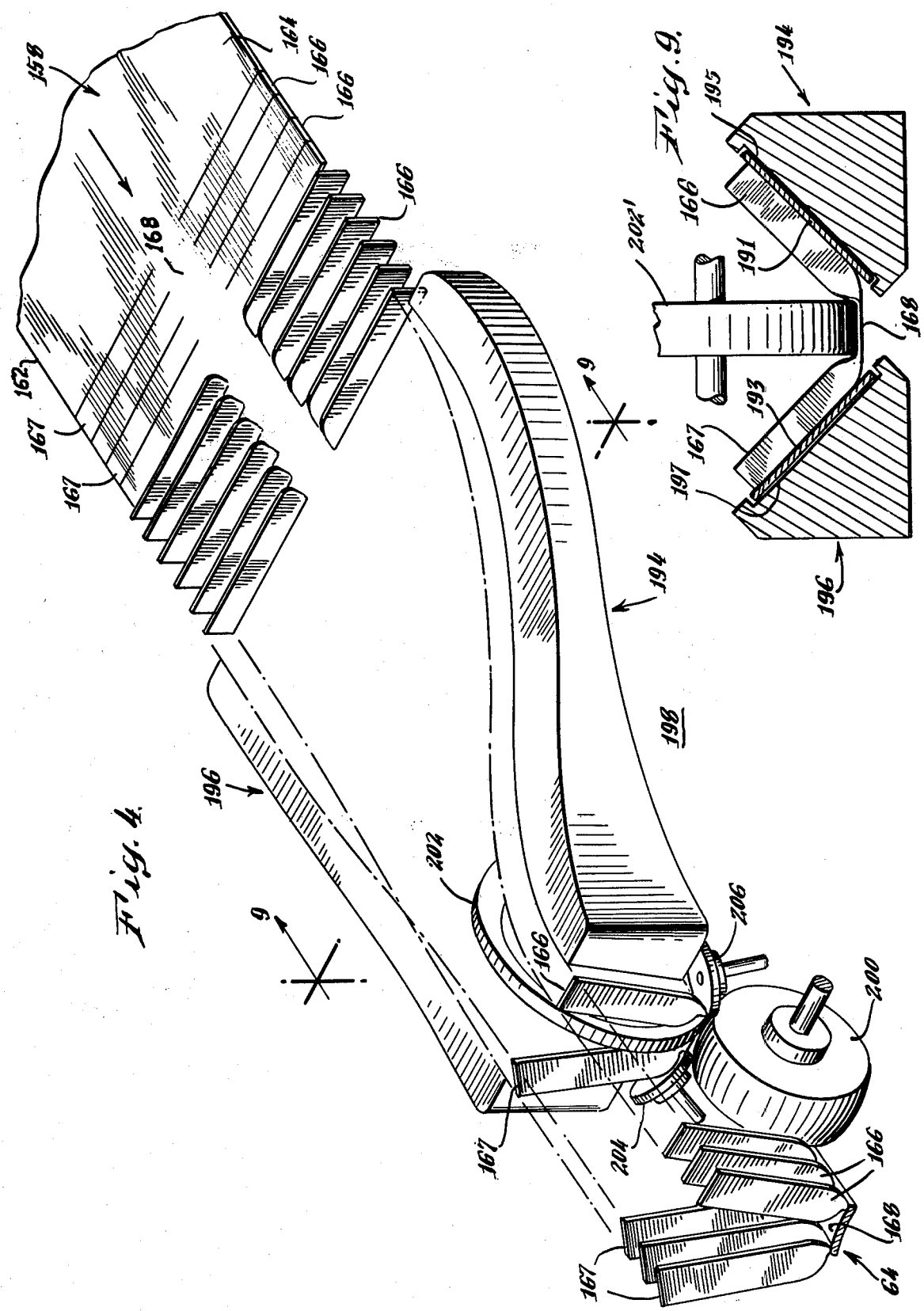

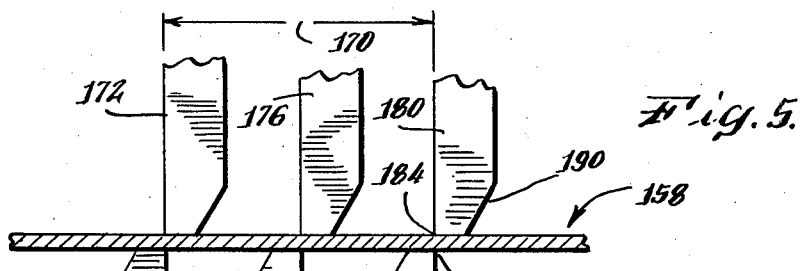
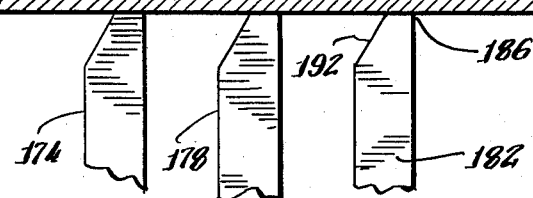
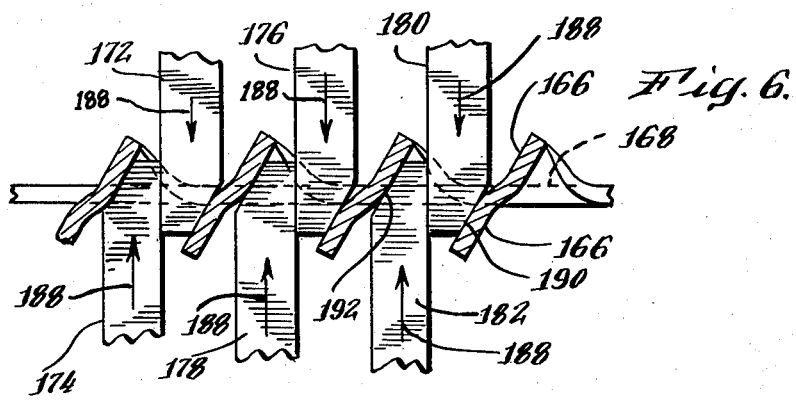
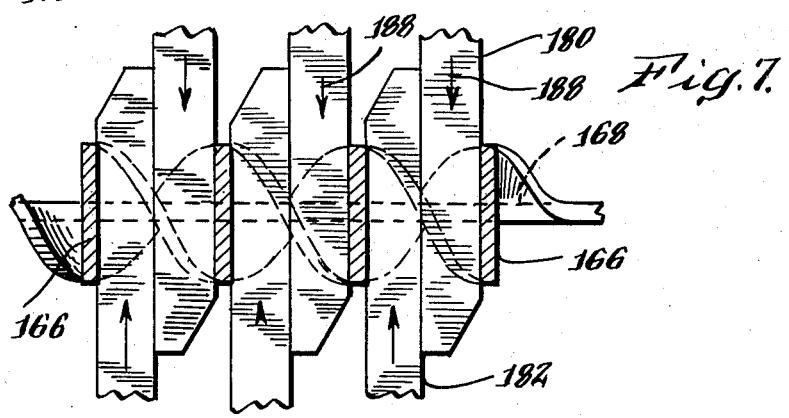
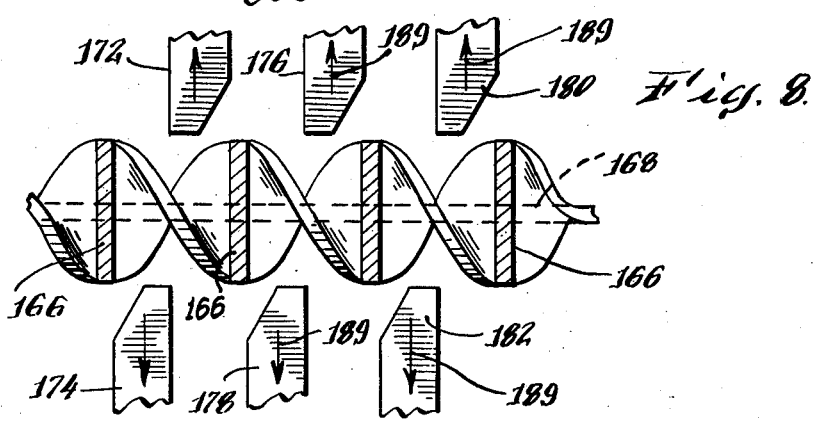

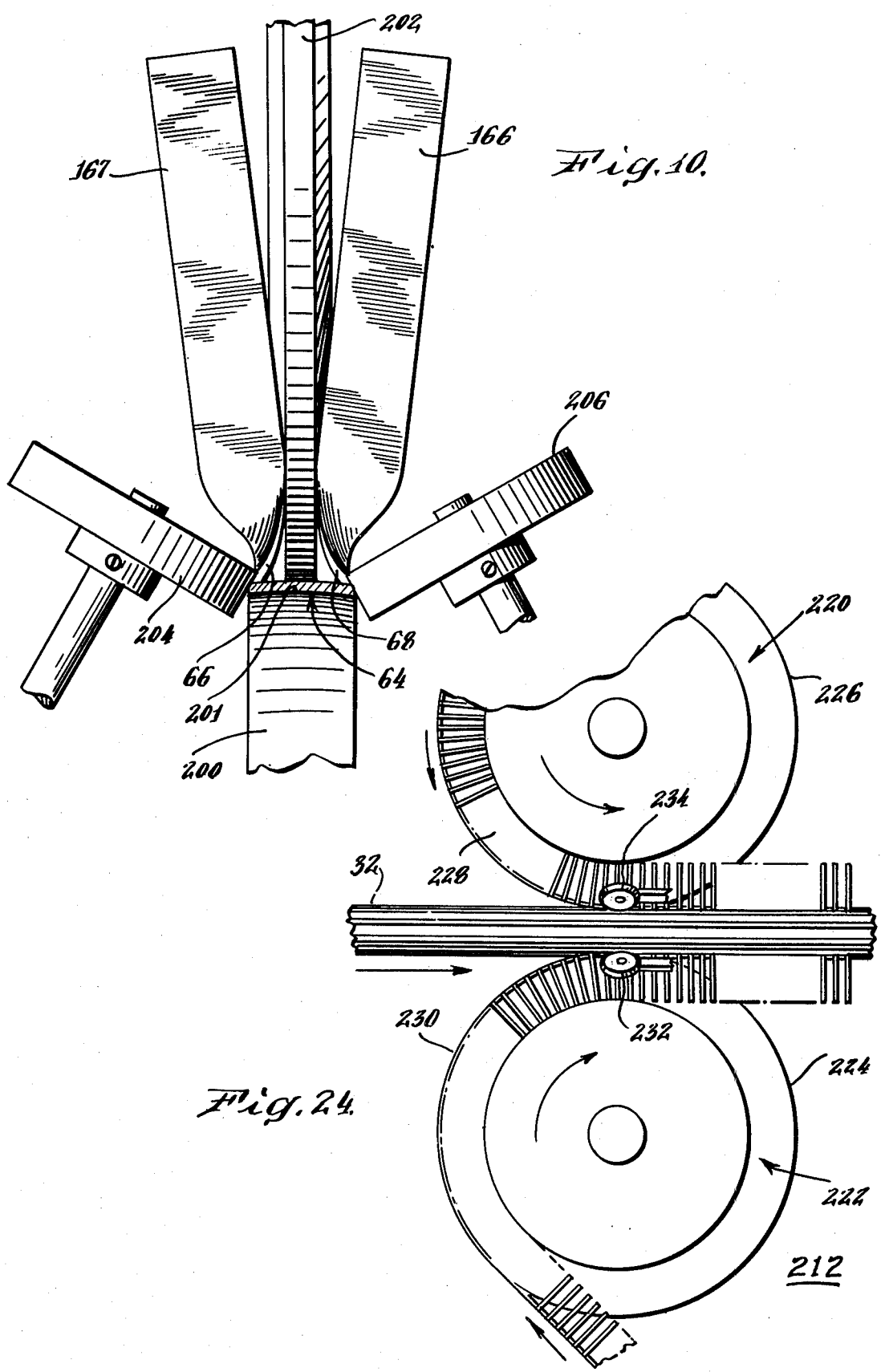

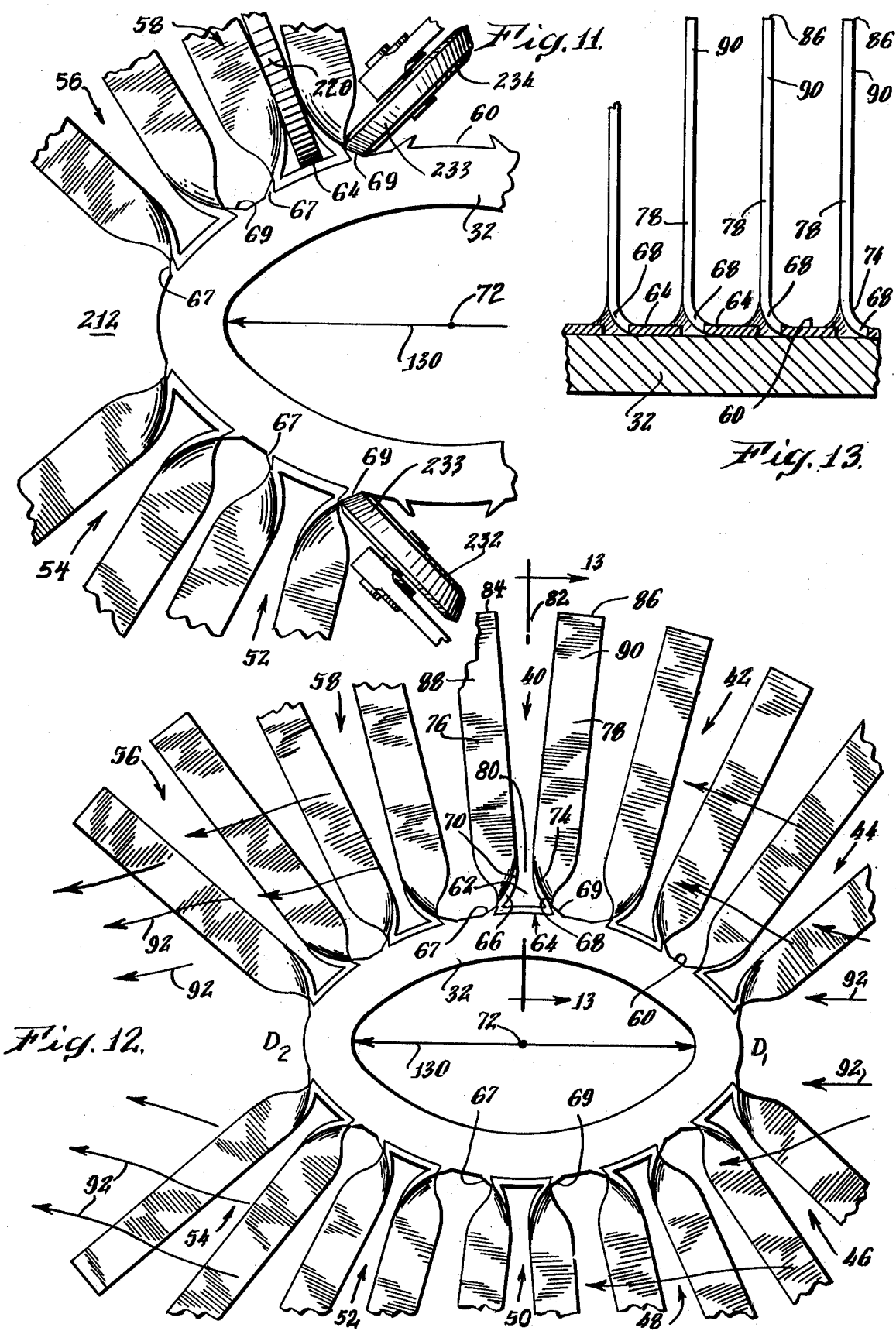

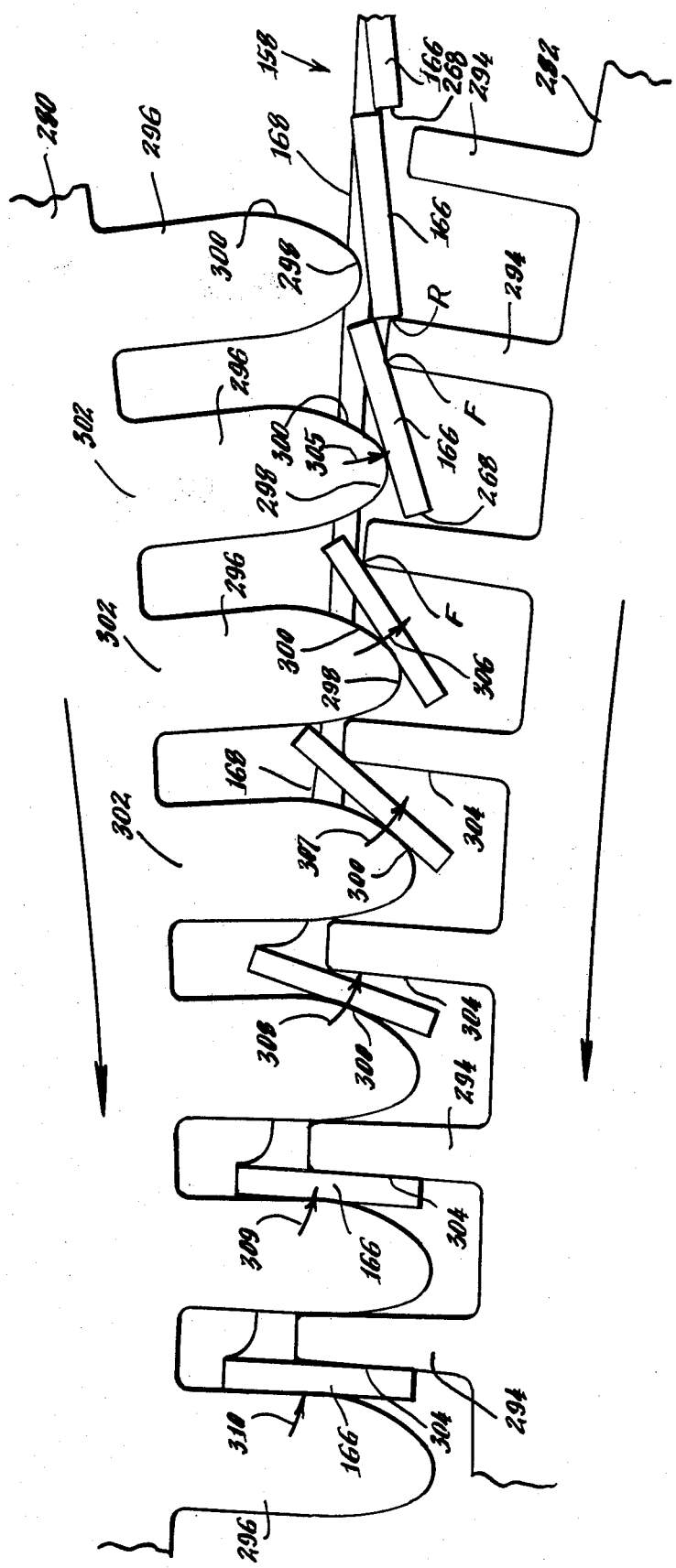

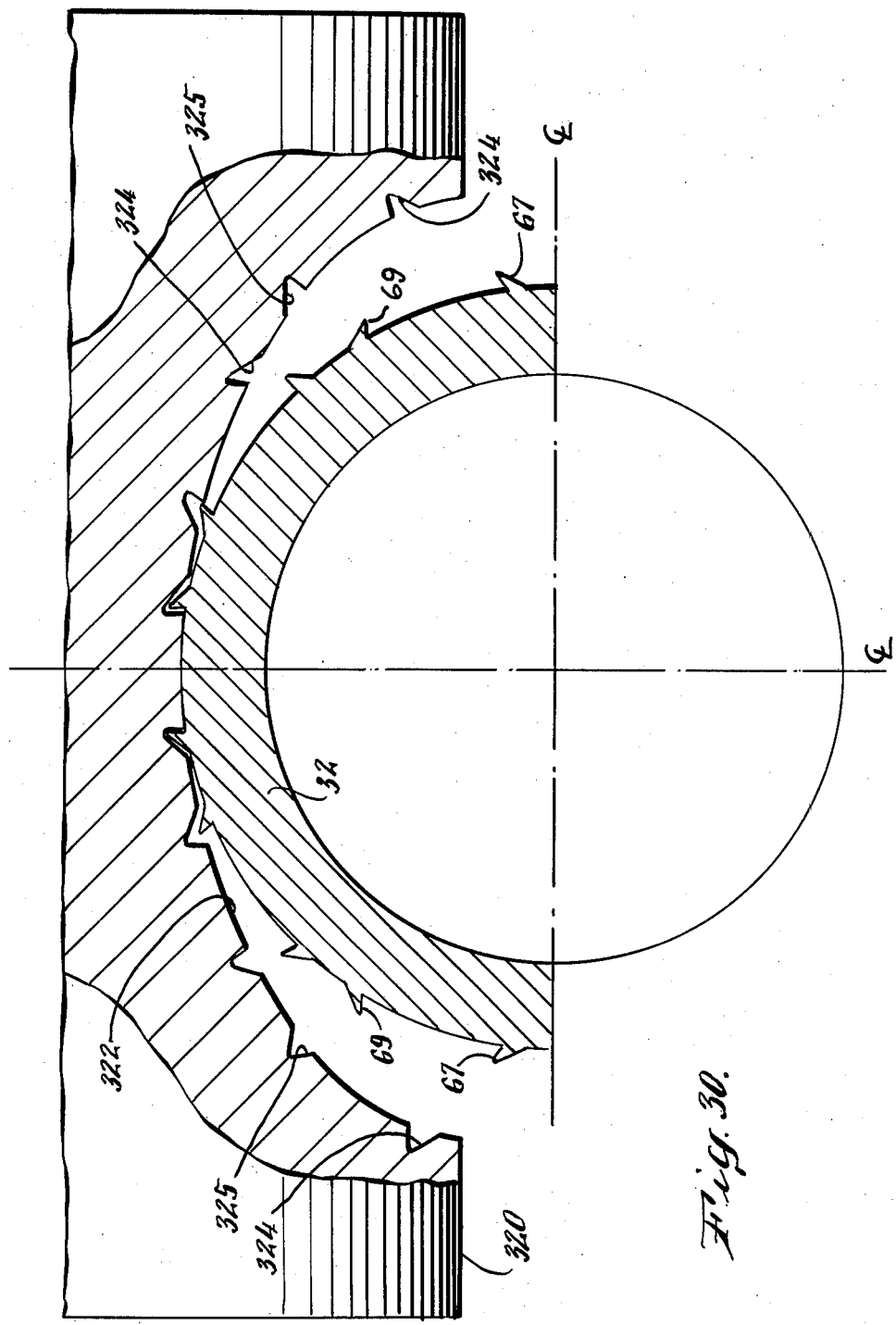

METHOD OF MAKING HEAT EXCHANGE TUBING ASSEMBLY

This is a division of application Ser. No. 781,925 filed Mar. 28, 1977 and now abandoned.

BACKGROUND OF THE INVENTION

This invention relates to an improved heat exchange tubing assembly and to an improved method for fabricating a heat exchange tubing assembly.

Various forms of heat exchange apparatus such as heating and air conditioning apparatus, include a heat exchange tube assembly through which is conveyed a heating or cooling medium. An exchange of thermal energy occurs between this medium and a second medium flowing over the tubing. Heat exchange with the second medium is enhanced by provided a plurality of heat exchange blades which are maintained in thermal contact with the tubing. The blades have a surface area substantially greater than their thickness and increase the effective heat transfer surface which is exposed to the surrounding atmosphere. One such arrangement is described in U.S. Pat. No. 3,457,756, wherein the tube includes integral flat flange segments and the blades are integrally formed with the tube from the flange segments. In another arrangement, the blades are integrally formed in a strip of material which is then continuously helically wound on the tube and secured thereto by an adhesive which is positioned between the strip and the tube.

These prior techniques for increasing the effective heat transfer surface exhibit several disadvantages. When the blades are integrally formed with the tubulation, the number of blades which can be provided to increase the heat transfer surface is substantially limit since a tabulation can provide only a limited number of flat flanges before the cost and assembly procedures become uneconomical and cumbersome. When the blades are formed in a strip which is wound about the tubulation, it has been found that the adhesive used for bonding limits the thermal-conductivity between the blades and the tubulation. In some cases, additional metal, with concomitant additional weight and cost, may be used in the tubing or in the bladed strip or in both to compensate for the thermal insulation effect of the non-metallic bonding layer between the tubing and bladed strip. In addition, fabrication of the heat exchange assembly by helically winding the strip on the tubing is relatively slow and reduces the production capability while increasing the overall cost of the heat exchange tubing assembly.

Furthermore, with the helically wound bladed strip the individual blades become generally uniformly distributed around the full periphery of the circular tubing. When the external fluid medium flows past this bladed tubing in a direction generally perpendicular to the tubing axis, there are fluid flow "dead spaces" which occur immediately ahead of and immediately behind the tubing. The particular blades which happen to project forward ahead of the tubing or backward behind the tubing are resident in these dead space regions where the fluid flow is slow or stagnant. Accordingly, such blades are not very effective in contributing to the overall heat exchange capacity of any apparatus in which such prior art tubing is utilized.

Accordingly, it is an object of this invention to provide an improved heat exchange tube assembly.

Another object of the invention is to provide an improved method for fabricating a heat exchange assembly.

Another object of the invention is to provide a heat exchange tube assembly having improved means of mounting a blade strip to the tubulation.

It is a further object of the present invention in accordance with a presently preferred embodiment thereof to provide a streamlined tube assembly which reduces the dead spaces ahead of and behind the tubing and wherein the blades fan out into regions on opposite sides of the tubing where the external fluid flow is relatively unimpeded by the streamlined tubing itself.

SUMMARY OF THE INVENTION

In accordance with the general features of this invention, a heat exchange tubing and multiple heat exchange blade assembly comprises an elongated tube having a longitudinal axis and an elongated heat exchange blade strip positioned thereon. The heat exchange strip includes a longitudinally extending array of integrally formed blade segments which extend from a continuous support segment of the strip stock. This continuous support segment, in a preferred embodiment, is centrally located in the strip stock and is bent into a generally U shape, as seen in cross section. The strip is supported on an outer surface of the tube and extends in the direction of a longitudinal axis of the tube. A means integrally formed with the tube, maintains the support segment on the tube in thermal contact with the surface of the tube. The blades are positioned at a favorable angle of attack to optimize heat transfer versus fan energy ratio, and the blades in one illustrative embodiment are shown positioned for orienting their surfaces in planes which are generally normal to the longitudinal axis of the tube.

In accordance with more particular features of the invention, the means for maintaining the strip in thermal contact with the tube comprises first and second tube segments which are integrally formed with the tube, which extend longitudinally with the tube and which extend outwardly from the exterior surface of the tube and which are spaced apart for captivating the support segment of the strip therebetween. A plurality of strips are provided which are spaced about the circumference of the tube and extend longitudinally therewith. In a preferred arrangement, the captivating tube segments comprise buttresses at least one of which is deformable to mechanically engage and restrict movement of the strip. The tube preferably has an elliptical shaped cross-sectional configuration wherein a major axis thereof is positioned substantially parallel to a direction of flow of an exterior heat transfer fluid stream.

The blades of a strip are shown arrayed longitudinally in pairs in a same plane normal to the longitudinal axis of the tube or they are alternatively positioned in a staggered array. In addition, the blades of laterally adjacent strips are positioned in alignment or are relatively staggered.

In accordance with other features of the invention, a method for fabricating a multi-bladed heat exchange tube assembly comprises the steps of shearing strip stock to provide a plurality of blade segments, rotating the sheared blade segments to achieve the desired angle of attack in the final heat exchange tubing assembly, and forming the rotated blade segments to provide a longitudinally extending array of juxtaposed or staggered blades which extend from the support segment of the strip stock, which support segment is shown as generally U-shaped. A tube is formed to provide a plurality of longitudinally extending, integrally formed captivating segments. The blade support segment is applied between the captivating tube segments and at least one of the segments is deformed to mechanically engage the strip and secure it to the tube.

In a presently preferred embodiment, the tube has a generally streamlined oval cross section for utilization in heat exchanger apparatus, such as in an air conditioner, refrigerator, heat pump, oil cooler, automobile radiator, automotive space heater, air heater for dwelling or working space, with the tubing arranged such that the minor axis of the oval extends perpendicular to the external fluid flow and its major axis extends parallel therewith for reducing the frictional drag and turbulence of external fluid flow and with the multiple blades fanning out from opposite sides of the oval along its two gently curving arcuate faces where the fluid flow is relatively unimpeded. Moreover, the individual blades in a preferred embodiment are tapered so as to decrease in thickness from root to tip, thereby reducing the mass and weight of thermally conductive material in the blade strips while providing suitable thermal conduction and mechanical strength in the individual blades.

As used herein, the term "strip" or "strip stock" is intended to include thermally conductive flat wire of uniform thickness or of tapered cross section, and is intended to include thermally conductive strip material of uniform thickness or of tapered cross section.

In accordance with other features of the method of the invention, a plurality of strips are mounted on the tube by advancing the tube with blade strips previously mounted thereon to successive stations at which blade strips are similarly applied to the tube at different circumferential locations. The heat transfer assembly thus formed is shaped into a desired configuration, cut to length, and coupling fittings are mounted thereon.

BRIEF DESCRIPTION OF THE DRAWINGS

These and other objects and features of the invention will become apparent with reference to the following specification and to the drawings wherein:

FIG. 4 is a perspective view of an apparatus for forming a heat exchange blade strip in accordance with one embodiment of the invention;

FIGS. 5–8 are views of tooling means employed in shearing and rotating blade segments while forming the heat exchange blade strip of this invention;

FIG. 9 is a view taken along line 9—9 of FIG. 4;

FIG. 10 is an enlarged view of a portion of the apparatus of FIG. 4 for forming and setting the blade strips;

FIG. 11 is an enlarged, fragmentary view of the apparatus utilized for securing a blade strip to a tube;

FIG. 12 is an enlarged fragmentary view of a section of a heat exchange tube and multiple heat exchange blade assembly constructed in accordance with features of this invention;

FIG. 13 is a view taken along line 13—13 of FIG. 12;

FIG. 24 is a side view of an assembling apparatus for applying an elongated blade strip to a heat exchange tube;

FIG. 29 is a greatly enlarged elevational sectional view of a continuous method and apparatus for final twisting of the blades; and FIG. 30 illustrates method and apparatus for ovalizing the tube with strip captivating segments thereon.

DETAILED DESCRIPTION

Figure 1:
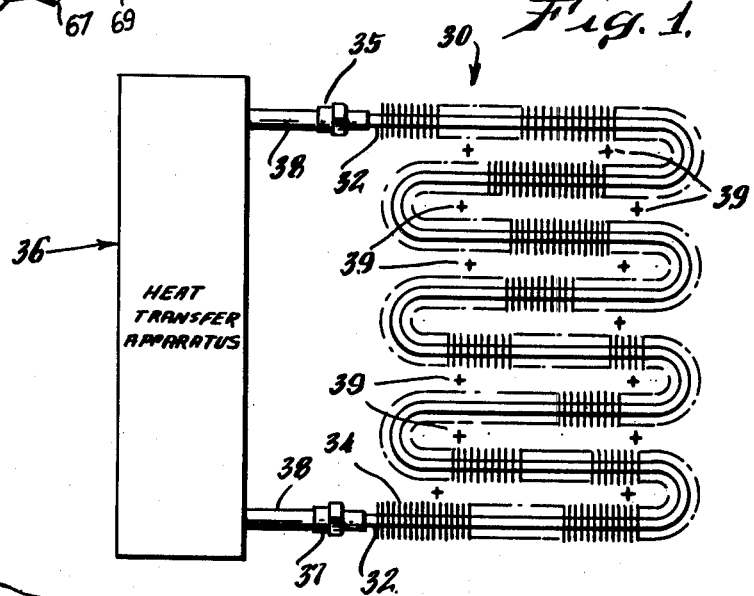
FIG. 1 is a schematic diagram, partly in block form, of a heat transfer apparatus having a heat transfer tube assembly constructed in accordance with features of the invention.

Referring now to the drawings, a heat exchange tube and multiple heat exchange blade assembly constructed in accordance with features of the invention is represented generally in FIG. 1 by reference numeral 30. Assembly 30 comprises an elongated tube 32 and one or more elongated heat exchange strips represented generally as 34. The tube 32 is shown formed into a serpentine configuration such as may be provided with a heat transfer apparatus 36 as for example an air conditioning apparatus. Other various configurations can be provided to satisfy the needs of particular apparatus. A heat transfer fluid medium in liquid or gaseous form flows from the apparatus 36 and through the tube 32. Fluid tight fittings 35 and 37 couple the tube 32 to conduit 38 of the apparatus. Thermal energy is exchanged with a second fluid medium flowing over the assembly and which, for example, comprises air flowing in a direction normal to the length of the tube. In FIG. 1, this flow is into the plane of the paper as represented by the arrow tails 39.

Referring now to FIG. 12, the plurality of elongated heat exchange strips 34 includes strips 40, 42, 44, 46, 48, 50, 52, 54, 56 and 58 spaced circumferentially about an exterior surface 60 of the tube 32 and extending in a direction outwardly therefrom. The elongated strip 40 which is typical of each of the strips is formed of aluminum, copper or other material which exhibits relatively high thermal conductivity. It includes an integral support segment 62 of generally U-shaped configuration having an arc-shaped base segment 64 and outwardly extending, spaced apart leg segments 66 and 68. The base segment is arc-shaped to conform with a surface arc of the tube 32. The U-shaped segment is positioned between longitudinally extending and outwardly extending tube segments 67 and 69 and is captivated in thermal contact with the tube 32 as described in greater detail hereinafter. A surface 70 of the leg segment 66 is shaped to curve in a first angular direction, when viewed from above the strip, from an orientation substantially parallel to a longitudinal axis 72 of the tube 32 to an orientation substantially normal to the axis 72. Similarly, a surface 74 of leg segment 68 curves, but in a second opposite angular direction. The leg segments 66 and 68 extend to integral blade segments 76 and 78 respectively, which fan out in a plane normal to the axis 72 from a relatively narrow spacing at a location 80 of close spacing between the leg segments 66 and 68 to a relatively larger spacing at a location 82 near their distal segments 84 and 86 respectively. Surfaces 88 and 90 of the blade segments 76 and 78 extend in substantially the same plane which is substantially normal to the longitudinal axis 72 of the tube 32 and parallel to the direction of air flow, as indicated by the arrow 92. The strip 40 includes a plurality of blade pairs which extend in a longitudinal array. Blades may be spaced apart longitudinally of the strip by a distance determined by the minimum desired spacing in the direction normal to the fluid flow direction to achieve a reasonable upstream (downstream) pressure drop. This normal spacing may be as small as 0.030 of an inch for air at standard temperature and pressure for a reasonable pressure drop. In this embodiment, as shown assembled in FIG. 12, and as being formed in FIG. 4, there are twenty blades per inch of strip stock and their spacing is 0.050 of an inch longitudinaly of the strip 158. This wider spacing produces less pressure drop as compared with a blade spacing of 0.030 of an inch.

In a preferred arrangement, the thickness of the blades tapers. The U-shaped support segment is semi-rigid in that it can be bent during the assembly process in a longitudinal direction yet it is sufficiently stiff to support the blade segments in an upstanding attitude, as is shown. The blades preferably taper in thickness to a relatively more narrow thickness at the distal edges 84 and 86. For example, as shown, there is a tapering in thickness from 0.006 of an inch at the center of the base segment to 0.003 of an inch at the distal edges 84 and 86, which provides a combination of desirable mechanical and heat transfer characteristics for a strip.

Figure 2:
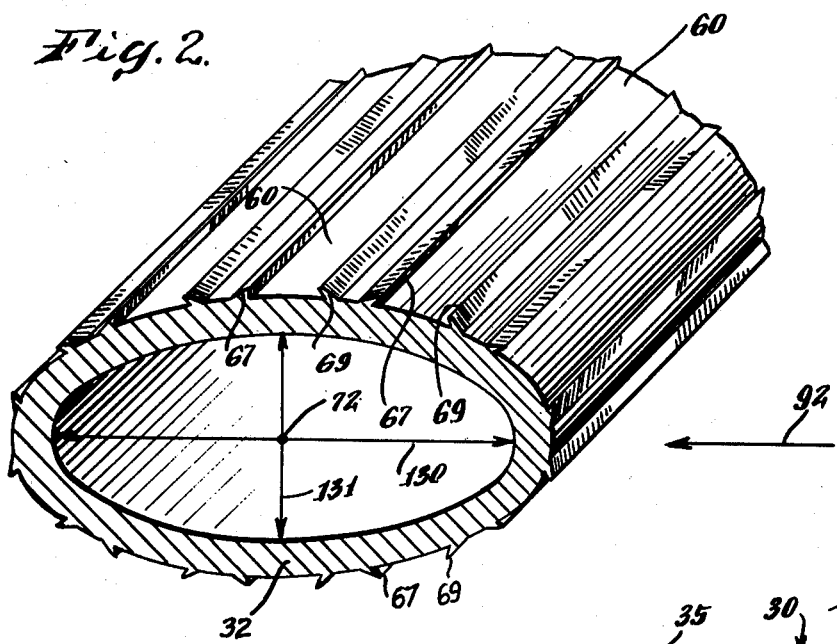
FIG. 2 is a fragmentary sectional view in perspective of a section of a tube of a heat transfer tube assembly constructed in accordance with the features of one embodiment of the invention.

As indicated hereinabove, the elongated heat exchange blade strips are supported in thermal contact with the exterior surface of the tubing 32. A heat transfer medium flows through the tube and heat transfer is effected by thermal conductivity between the tube 32 and the strips. The tube 32 is fabricated of a material exhibiting relatively high thermal conductivity as, for example, aluminum or copper. Thermal transfer with the fluid medium is enhanced by reducing friction drag. The tube 32 has a preferred cross-sectional configuration, as illustrated in FIG. 2, which is elliptical and having a major axis 130 parallel to the direction of air flow which is indicated in FIG. 2 by the arrow 92 and with its minor axis 131 perpendicular to this air flow.

By virtue of this elliptical cross section, the tubing assembly, as shown also in FIG. 12, offers a generally streamlined configuration for the airflow 92 passing by. Thus, the turbulence induced in the airflow 92 is minimized so that a vigorous airflow can be provided for effective efficient heat transfer with a minimum amount of fan or blower horsepower required for the heat exchanger. The "dead spaces" $D_1$ and $D_2$ (FIG. 12) immediately in front of and immediately behind the tubing 32 where the air flow tends to be slow or stagnant are minimized in extent. Advantageously, the multiple blades fan out from opposite sides of the elliptical tubing along its two gently curving arcuate faces, as seen in FIG. 12. Therefore, all of these blades project into and are resident in the two regions on opposite sides of the tubing where the airflow is substantially unimpeded by the tubing itself.

For minimizing the streamline effect and for maximizing the extent of the two gently curving arcuate surfaces on opposite sides of the tubing 32 from which the multiple blades fan out, it is desirable to form this tubing with a relatively great ellipticity, i.e. to increase the ratio of its major axis to minor axis. However, if the ellipticity becomes too great, then the passage for fluid flow within the tubing 32 becomes unduly restricted. Accordingly, the practicable limit on ellipticity is a ratio of major axis to minor axis of approximately 2 to 1, which is the ratio as shown in FIGS. 2, 11 and 12.

A means is integrally formed with the tubing for maintaining the heat exchange blade strips in thermal contact with the exterior tube surface 60. This means comprises first and second longitudinally extending, integrally formed tube segments 67 and 69 which extend outwardly from the surface and are circumferentially spaced apart for receiving the base segment 64 (FIG. 12) of the U-shaped support segment 62 therebetween and for captivating it. At least one of the segments 67, 64, 69 is mechanically deformed along its length such as by crimping and folds over a portion of the U-shaped base segment 64 for captivating it along its length in thermal contact with the exterior surface 60. A plurality of similar tube segments are spaced circumferentially and extend longitudinally for captivating a plurality of strips. In FIGS. 2 and 12 the tube segments are shown as barb or buttress shaped. Other suitable deformable cross sectional configurations can be utilized. The tube segments are formed simultaneously with the tube during a tube extrusion process or they are alternatively machined in the tube surface after the tube itself has been formed.

Figure 14:
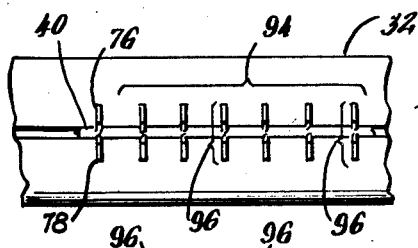
FIG. 14 is a plan view of an array of heat exchange blades constructed in accordance with one embodiment of the invention.
Figure 15:
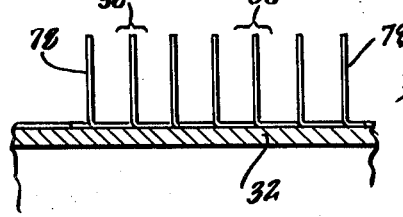
FIG. 15 is a fragmentary view in elevation and partly in section of the blade array of FIG. 14.
Figure 16:
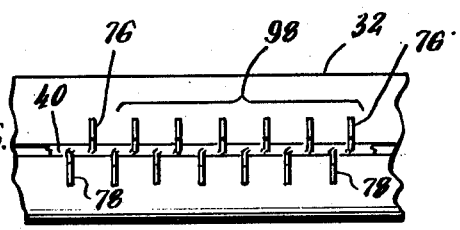
FIG. 16 is a plan view of an array of heat exchange blades constructed in accordance with an alternative embodiment of the invention.
Figure 17:
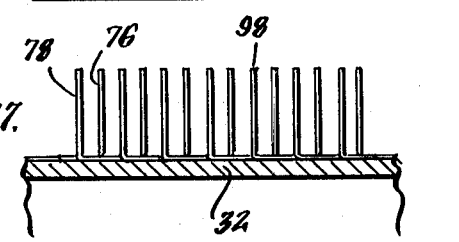
FIG. 17 is a fragmentary view in elevation and partly in section of the blade array of FIG. 16.
Figure 18:
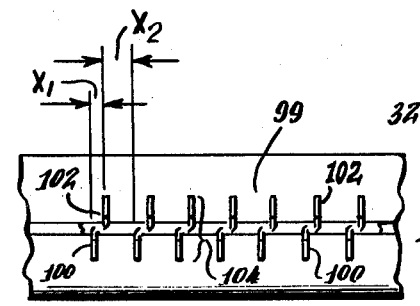
FIG. 18 is a plan view of an array of heat exchange blades constructed in accordance with another alternative embodiment of the invention.
Figure 19:
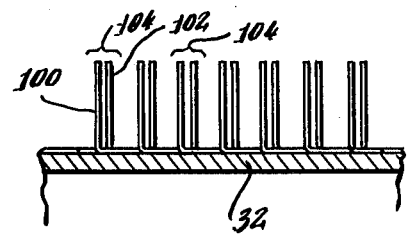
FIG. 19 is a fragmentary view in elevation and partly in section of the blade array of FIG. 18.

As illustrated in FIG. 14, the strip 40 includes a longitudinally extending array 94 of blades wherein the blades are aligned as pairs 96 in a same plane. Alternatively, the blades of an array 98 are not aligned as pairs in a same plane but are staggered as shown in FIGS. 16 and 17 so that the blades are substantially equidistant in a longitudinal direction. A further alternative longitudinally offset array is illustrated in FIGS. 18 and 19 wherein blades 100 and 102 of a pair 104 are longitudinally offset. However, the blades 100 and 102 are separated by a distance $X_1$ while the blades 102 and 106 are offset by a greater distance $X_2$.

Figure 20:
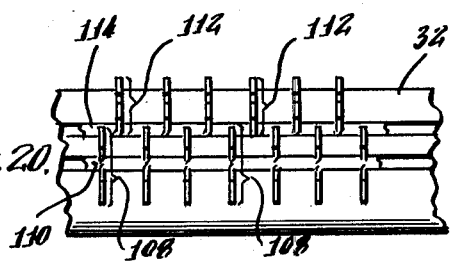
FIG. 20 is a plan view of another array of heat exchange blades constructed in accordance with another alternative embodiment of the invention.
Figure 21:
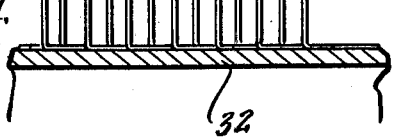
FIG. 21 is a fragmentary view in elevation and partly in section of the blade array of FIG. 20.

In addition to a longitudinal offset of blades in a same array, the blade locations of the different strips are staggered as illustrated in FIGS. 20 and 21. Although blades of pair 108 of strip 110 are aligned in a same plane, the blade pairs 112 of adjacent strip 114 are longitudinally offset from the blades 108.

Figure 22:
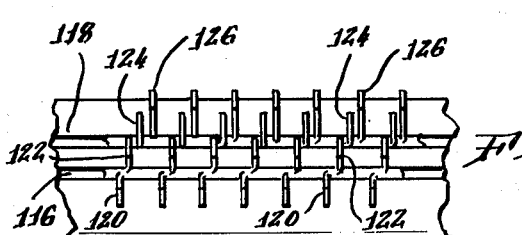
FIG. 22 is a plan view of an array of heat exchange blades constructed in accordance with another alternative embodiment of the invention.
Figure 23:
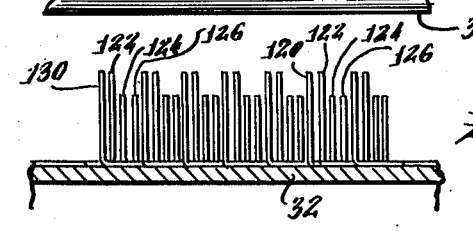
FIG. 23 is a fragmentary view in elevation and partly in section of the blade array of FIG. 22.

Various combinations of blade offsets of the same and adjacent strips can be made to increase fluid medium contact with the surfaces of the blades. In FIGS. 22 and 23, the blade offset of FIG. 18 and strip offset of FIG. 20 are combined. In this arrangement, the blades 120 and 122 of strip 116 are offset. Similarly, the blades 124 and 126 of strip 118 are offset. Strips 116 and 118 have the same blade arrangements, but the strips are longitudinally offset one from the other. Similar strips are utilized and the strips are positioned to provide for offset between lateral adjacent blades of the different strips.

Figure 3:
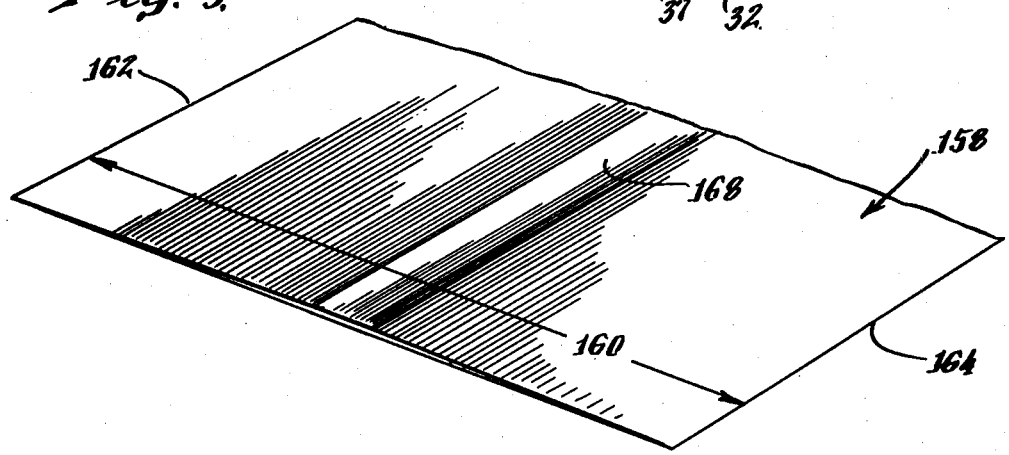
FIG. 3 is a fragmentary perspective view of strip stock from which a heat transfer blade strip of this invention is fabricated.
Figure 25:
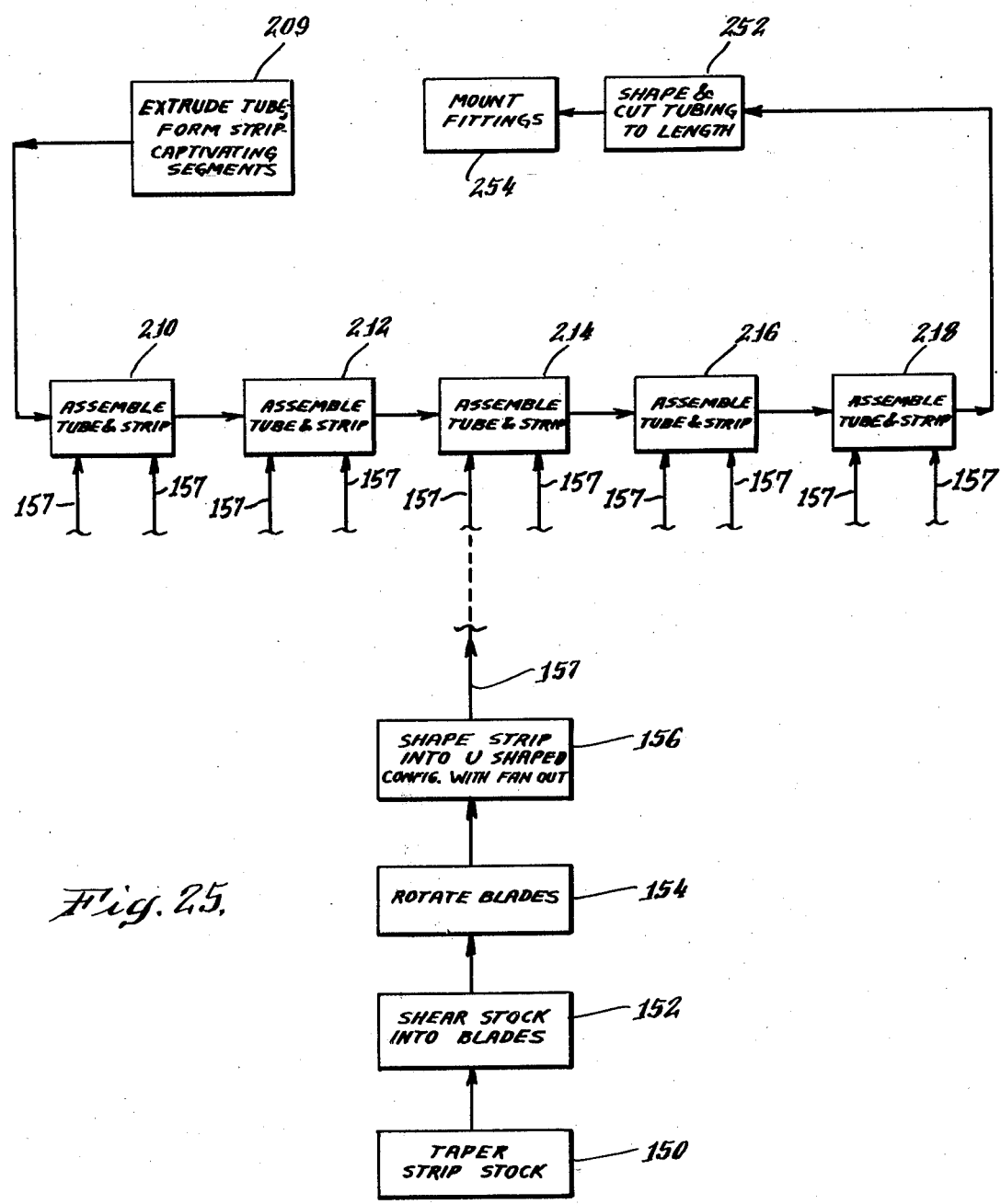
FIG. 25 is a flow diagram in block form illustrating the method for forming a heat exchange tubing and multiple heat exchange blade assembly in accordance with features of the method of this invention.

A method in accordance with the features of the invention for fabricating an assembly of elongated tube having elongated heat exchange strips is illustrated in the flow diagram of FIG. 25. As represented by the blocks 150, 152, 154 and 156, tapered strip stock 158 (FIG. 3) is formed having a width 160 substantially equal to the sum of the lengths of the blade segments and the U-shaped segment of a blade. The thickness of the stock tapers from a greater central thickness to relatively smaller dimensions near the elongated edges 162 and 164. The stock is formed of aluminum or copper or other material of relatively high thermal conducitivity. In a preferred particular embodiment, the stock tapers from a central thickness of about 0.006 of an inch to a thickness of about 0.003 of an inch near the edges 162 and 164. The tapered strip stock 158 is supplied to a shearing station 152 (FIG. 25) at which location the stock is sheared into relatively narrow blades 166 and 167, as illustrated in FIG. 4. The sheared blades are rotated an angular distance of about ninety degrees about their roots thereby providing that the planes of rotated blades are normal to the plane of a centrally located planar segment 168 (FIG. 4).

Shearing the rotating of the blades 166 and 167 is conveniently accomplished in a single operation, as illustrated in FIGS. 5-8. The stock is advanced with stepwise motion a distance 170, which is a multiple of the blade width, so that a length of the stock is positioned between three sets of cutter bits 172-182. Each of these cutter bits includes a cutting edge as represented by the edges 184 and 186 of the cutter bits 180 and 182, respectively. These tool bits have lengths equal to the length of the sheared blades 166 extending from the flat segment 168 to the distal edges of these blades. A similar set of cutter bits are provided and disposed for shearing and rotating the blades 167. These extend from an opposite edge of the flat segment 168. For purposes of clarity in the drawing, the shear press which is well known is not shown.

The cutter bits are operated with a reciprocating motion in the direction of the arrows 188 and 189 (FIGS. 5-8) in synchronization with a stepping of a length of stock between the cutter bits. During a shearing and blade rotating stroke, the cutter bits 180 and 182 advance in the direction of arrows 188 and shear the stock to provide juxtaposed blades 166. In addition, the cutter bits overtravel the fully cut position and continue to advance to cause deformation and rotation of the sheared blade segments. This is best illustrated in FIGS. 6 and 7 wherein the bits 180 and 182 continue to travel beyond the fully sheared position. Tapered shoulder segments 190 and 192 engage the surface of the sheared segments forcing them to rotate in a counterclockwise direction, as viewed in FIGS. 5, 6 and 7. The cutter bits continue their rectilinear motion until the sheared blade segments 166 have been rotated an angular distance of about ninety degrees with respect to a plane of the flat segment 168 of the stock. This is illustrated in FIG. 7. After thus having sheared and rotated the blades 166, the bits are withdrawn from the workpiece by reversing the direction of their rectilinear motion as indicated by the arrows 189 of FIG. 8. When the tool bits clear the workpiece, the stock is then advanced a distance 170 to initiate a subsequent shearing cycle. Longitudinally staggered blades, as illustrated in FIGS. 16-19 are fabricated by offsetting the cutter bits in the direction of motion of stock advance which form the respective right and left blades 166 and 167.

Figure 27:
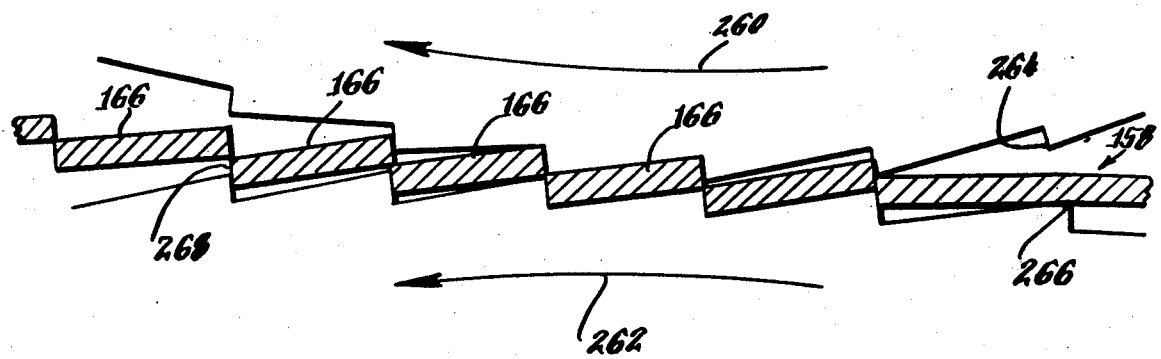
FIG. 27 is a greatly enlarged elevational sectional view illustrating a continuous method and apparatus for rotary shear with blade pre-twist.
Figure 28:
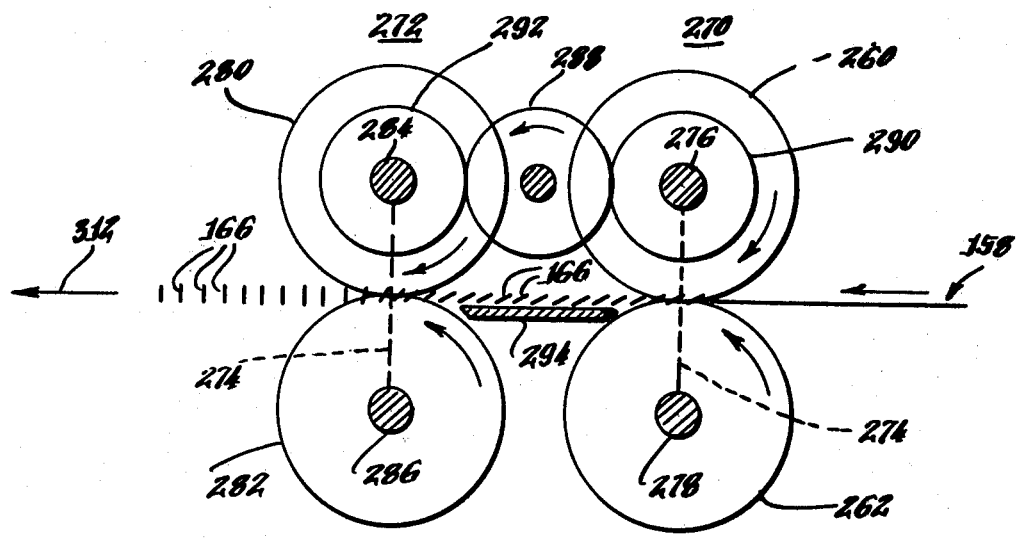
FIG. 28 is an elevational view of a continuous method and apparatus for shearing and pre-twisting the blades followed by final twisting thereof.

An alternate method for forming and twisting of the blades with continuous strip motion is shown in FIGS. 27-29 which are described further below. When stepwise strip motion is used for fabricating the blades, as shown in FIGS. 5-8, then a slack input loop and a slack output loop are provided in the strip stock preceding and subsequent to the shearing and twisting operation. These slack loops are similar to the slack loops provided in a motion picture projector for accommodating the local stepwise motion, relative to the continuous motion occurring elsewhere in the whole assembly method.

As indicated in FIG. 4, the sheared and rotated blades are formed into U-shaped segments having a base segment which conforms with the surface of a tube upon which the strip is to be mounted. In FIGS. 4 and 9, the strip having sheared and twisted blades is shown being advanced through a blade fan out positioning operation 198 which includes deformation of the continuous center strip segment 168 during which the sheared and twisted blades are progressively deflected toward each other in a direction normal to the plane of the original strip stock 158 by positioning mechanisms 194 and 196. These blade fan out positioning mechanisms 194 and 196 may include moving skewed surfaces 191 and 193, respectively, of belts moving at approximately the same speed as the twisted blades 166 and 167 for progressively deflecting these blades into their fan out position. Guides 195 and 197 are shown for guiding the respective moving surfaces. A plurality of rolling surfaces arranged in a suitable pattern may be used for performing the forming operation 198. A forming wheel 202' (FIG. 9) engaging the continuous strip segment 168 is shown located upstream from the wheel 202 (FIGS. 4 and 10) for initiating the bending of the U-shaped support segment 64 for the blades.

The blade positioning operation 198 is shown using forming wheels 200, 202, 204 and 206. These wheels, as shown in FIGS. 4 and 10, establish forces on the strip being formed which shapes the flat segment 168 of the strip to conform to the shape of the tube 32, forms the U-shaped segment 64 referred to hereinbefore, and sets the blade segments to the desired degree of fan out. The wheel 200 provides a rotating arcuate rest for the strip while the wheel 202 operates to form the base segment to the desired curvature of the tool rest.

The convex transverse rim curvature 201 (FIG. 10) of the wheel 200 is selected to conform to the curvature of a tube surface 60 (FIG. 2) upon which a strip is to be mounted. At the same time that the base segment is being formed, the tool wheels 204 and 206 in cooperation with tool wheel 202 form the integral U-shaped strip segment 64 and set the blades 166 and 167 to the desired degree of blade fan out. This is accomplished by tool wheels which are configured and dimensioned to provide the desired shaping of the base segment and fan out of the blades. These characteristics are selected to satisfy the needs of particular heat exchange tube arrangements. The strip thus formed is supplied to one or more assembly stations 210-218 (FIG. 25). Forming of the bladed strip will progress at a rate adapted for supplying bladed strip material to each of the forming stations 210-218, as shown by the infeed arrows 157 in FIG. 25. Alternatively, separate strip forming means 150, 152, 154 and 156 as thus described are provided to independently supply each of the assembly stations with a bladed strip, as indicated by the respective infeed arrows 157.

In addition to supplying the formed bladed strip to each of the assembly stations, the tube 32 is formed and is supplied in sequence to the stations 210, 212, 214, 216 and 218. The tube is formed by extrusion and the longitudinally and outwardly extending tube segments 67 and 69 for captivating the tube strip are formed simultaneously and integrally with the tube during the extrusion process. In an alternative arrangement, the captivating tube segments 67 and 69 are formed by a machining process after the tube has been formed.

Alternatively, the tube with its multiple pairs of parallel longitudinal protruding attachment segments 67, 69 may initially be made as a strip which is thereafter rolled up and butt welded along its longitudinal edges into a tube.

Figure 26:
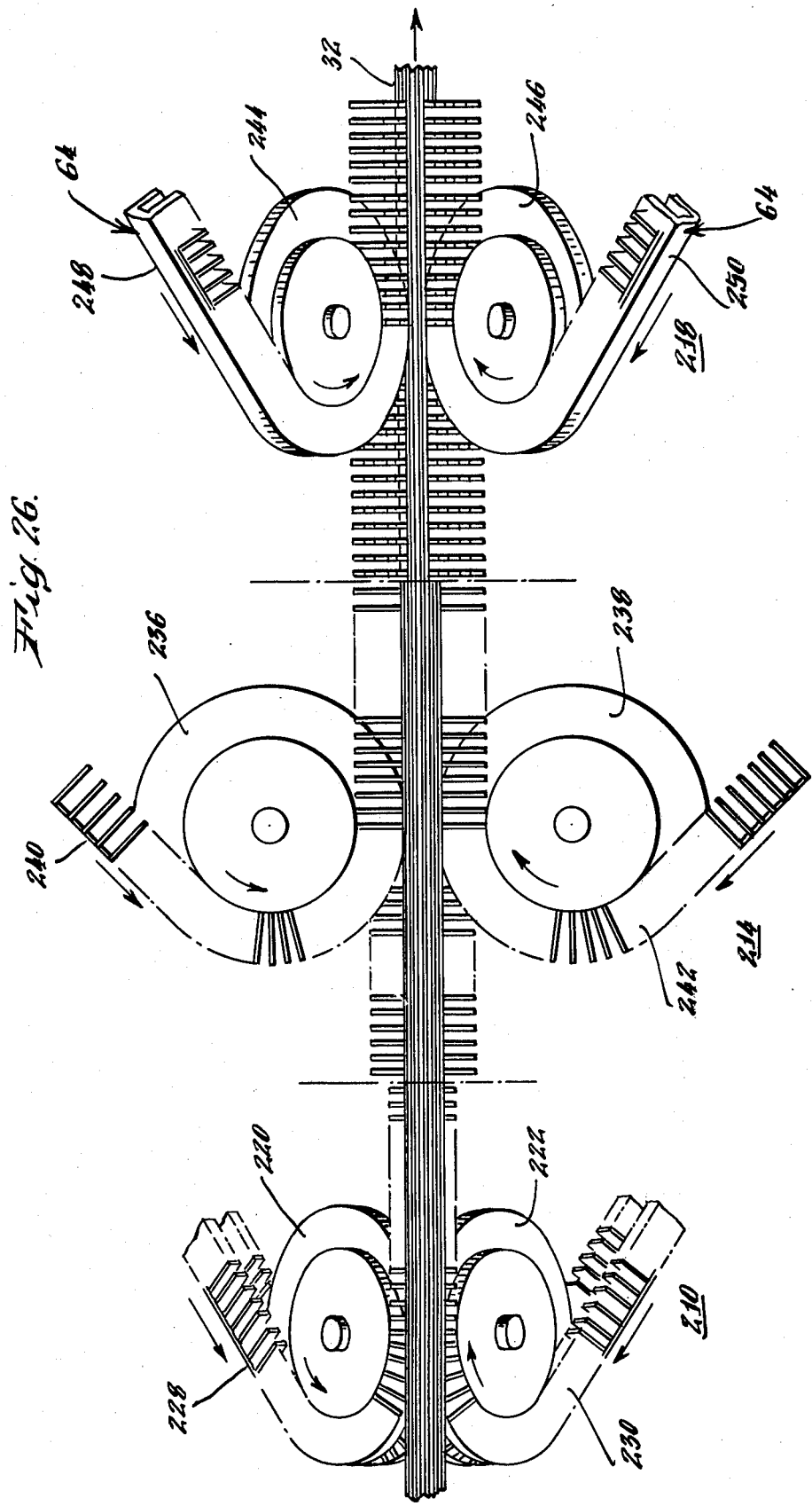
FIG. 26 is a diagram of a plurality of tube and heat exchange strip assembly stations illustrating the application of the heat transfer strips to the tubulation at a number of successively positioned assembly stations.

A tube having a plurality of captivating tube segment pairs 67, 69 is supplied to a first assembly station 210, as illustrated in FIGS. 24, 25 and 26. In FIG. 24, the tube 32 is shown transported between strip supply wheels 220 and 222. The wheels 220 and 222 are symmetrically located with respect to the tube cross section. They are so oriented for providing that a periphery 226 of the wheel 220 and a periphery 224 of the wheel 222 supply and position the base segments of strips 230 and 228, respectively, between pairs of captivating tube segments. For example, the arrangement of FIG. 11 illustrates strips 58 being similarly applied simultaneously. In this manner, the pairs of opposed bladed strips 56 and 54, 58 and 52, 40 and 50, 42 and 48, and the strips 44 and 46 are each simultaneously applied in paired relationship. This symmetrical application of bladed strip pairs in opposed relationship on opposite sides of the elliptical tube major axis 130 reduces the possibility of cross-sectional distortion as a result of the forces exerted on the tube during this bladed strip installation process.

There are also positioned at each of the assembly stations 210-218 crimping wheels such as the crimping wheels 232 and 234 at assembly station 212 and best illustrated in FIG. 11. The spacing between the captivating tube segments 67 and 69 is selected to provide a snug grip on the U shaped base segment 64 of the blade strip. Wheels 220 and 222 insert the U shaped segments between the segments 67 and 69. The segment 69 is then contacted and deformed by the crimping wheels 232 and 234 as the tube and strip traverse the crimping station. The crimping wheel causes the segment 69 to partly fold over and secure the strip in thermal contact with the exterior surface 60 of the tube 32. The tube 32 with the strips secured thereto is advanced from station 210 to successive stations 212-218 at which locations additional pairs of blade strips are inserted and crimped. Each of these stations applies pairs of strips in symmetrical fashion as indicated hereinbefore to the tube surface 60 at unoccupied locations on the surface between available tube segments 67 and 69. In FIG. 26, the assembly station 214 is shown to include wheels 236 and 238 for applying strips 240 and 242 respectively to the tube 32 while at assembly station 218, the wheels 244 and 246 are shown applying strips 248 and 250 respectively to the tube 32. Offset of the strips as illustrated in FIGS. 20-23 is provided by establishing an offset in the feed of the strips at successive stations.

The assembly of tube and strips is supplied from the station 218 to a shaping station represented by the block 252 in FIG. 25. The assembly of tube and blade strips is shaped into a desired configuration such as the serpentine configuration of FIG. 1. The tube is cut to desired length and coupling fittings as shown in FIG. 1 are mounted to the tube at a station 254.

There has thus been described an improved heat exchange tube assembly and method for fabricating the same wherein a heat exchange blade assembly is supported on and maintained in thermal contact with a heat exchange tube by means integrally formed with the tube. The arrangement is advantageous in that a relatively high density of heat exchange blades are formed on a heat exchange tube and an enhanced thermal conductivity between the blade strip and the tube is thereby provided.

It is to be noted, as seen in FIG. 10, that the tool wheels 200, 202, 204 and 206 form the generally U-shaped base of the bladed strip. The configuration of the arc-shaped base segment 64 plus the two leg segments 66 and 68 has an overall dovetail shape, as seen in cross section. Moreover, in FIGS. 2, 11 and 12, each of the integral projecting segments 67 and 69 of the tubing surface 60, which are spaced apart to define a channel between them, have a generally saw-tooth shape, as seen in cross section. The abrupt surface of each saw tooth faces inwardly toward the channel, while their more gently sloping surface faces away from the channel. Thus, the abrupt faces of the projecting saw-tooth segments or buttresses 67 and 69 are well adapted to captivate the dove-tailed configuration of the U-shaped base of the bladed strip. Also, their more gently sloping outer surfaces are advantageously oriented for crimping inwardly and downwardly onto the dove-tailed configuration of the U-shaped base of the strip. In this crimping operation, as seen in FIG. 11, the corner positions of the dovetail are driven inwardly and downwardly by the inclined crimping wheels 232 and 234 into firm contact with the tubing surface for providing excellent thermal conductivity between the tubing and the blades strips. The inclined crimping wheels 232 and 234 have rims 233 which slope inwardly toward the tubing axis 72 for camming the saw-tooth buttresses 69 inward and downward toward the captivated base segment 64. These crimping wheels 232 and 234 are supported by arms which are positioned at an angle to avoid the blades of the bladed strip being crimped onto the tubing.

The legends in FIG. 25 of the drawings read as follows:

| STEPS | LEGEND |
| --- | --- |
| 150 | TAPER STRIP STOCK |

| STEPS | LEGEND |
|---|---|
| 152 | SHEAR STOCK INTO BLADES |
| 154 | ROTATE BLADES |
| 156 | SHAPE STRIP INTO U SHAPED CONFIGURATION WITH FAN OUT |
| 209 | EXTRUDE TUBE & FORM STRIP-CAPTIVATING SEGMENTS |
| 210 | ASSEMBLE TUBE & STRIP |
| 212 | ASSEMBLE TUBE & STRIP |
| 214 | ASSEMBLE TUBE & STRIP |
| 216 | ASSEMBLE TUBE & STRIP |
| 218 | ASSEMBLE TUBE & STRIP |
| 252 | SHAPE & CUT TUBING TO LENGTH |
| 254 | MOUNT FITTINGS |

With reference to FIG. 10, the transverse rim curvature 201 of the arcuate wheel rest can be arranged to provide for toggle insertion of the U-shaped segment 64 between the captivating tube segments 67 and 69. Thus, the transverse curvature 201 is made considerably more abrupt, i.e. of smaller radius, than the mating tube surface. Therefore, the central portion of the base segment 64, as seen in FIG. 11, will initially hump up away from the tube surface. The insertion wheel 220 pushes down on this humped region, to deform it down against the tube surface, providing a toggle action for driving the two corners of the dovetail blade base into tight fitting engagement with the captivating tube segments 67 and 69. If desired, this toggle insertion step 220 plus the tube captivating segment crimping step 234 may both be employed for securely mechanically locking the bladed strip into good thermally conductive relationship with the tube.

As shown greatly enlarged in section in FIG. 27, the blades 166 (and 167) may be sheared from the strip stock 158 (FIG. 4) by a pair of opposed rotary shear wheels 260 and 262. Each shear wheel has a saw-shaped contour with sharp tooth tips 264 and 266 pressing in shearing relationship against opposite surfaces of the strip stock 158. The blades 166 (and 167) are sheared one from another and are initially twisted significantly out of the plane of the strip stock 158. This is a first-stage twist. Thus, the leading edge of each pre-twisted blade 166 presents an abrupt leading face 268, which is subsequently used to register each blade for a final twisting operation, as will be explained.

FIG. 28 shows a first station 270 for producing rotary shear and first stage twist of the blades. Downstream is a second station 272 for final twist of each blade. The opposed rotary shear wheels 260 and 262 have already been described with reference to FIG. 27. They are kept in registration by a mechanical interconnection 274 between their respective shafts 276 and 278. This mechanical interconnection is a pair of mating gears (not shown) mounted on the respective shafts 276 and 278 and having equal gear pitch circles for keeping the shear wheels 260 and 262 in registration and moving at a peripheral speed synchronized with the advancing strip stock 158.

In the final twist station 272, there are a pair of mating blade-twisting wheels 280 and 282 mounted on shafts 284 and 286, respectively. They are kept in registration by a mechanical interconnection 274 which is similar to that as discussed above.

In order to synchronize the final twist wheels 280 and 282 with the rotary shear wheels 260 and 262, there is an idler gear 288 mating with gears 290 and 292 on the respective shafts 276 and 284. A guide 284 serves to support and guide the strip having pre-twisted blades toward the final twist station 272.

As shown greatly enlarged in FIG. 29, the blade-twisting wheel 282 has relatively narrow teeth 294 which serve as pivot fulcrums about which the individual pre-twisted blades are finally twisted. Moreover, the abrupt leading face 268 of each successive blade 166 bumps against a successive one of the pivot teeth 294, as shown at the registration position "R" for positively registering each pre-twisted blade 166 with a pair of cooperating teeth of the blade-twisting wheels 280 and 282. In summary, the narrow pivot teeth 294 serve to index the pre-twisted blades and also serve as pivot fulcrums about which these blades are twisted into their final orientation.

The other blade-twisting wheel 280 has broader and more rounded teeth 296. The rounded tip 298 of each tooth 296 acts as a rolling cam. This rounded tip 294 produces a rolling camming action, as shown by arrow 305, for pushing the leading edge 268 of the blade down. Each blade is thereby progressively rotated about the pivot fulcrum "F" provided by the rounded leading corner of the cooperating pivot tooth 294.

The teeth 296 also have a more gently rounded trailing surface 300 which slopes inwardly toward the root 302 of the tooth 296. This rounded trailing surface 300 acts as a shallow cam for combing each blade to twist it down parallel with the cooperating combing surface 304 along the leading face of each pivot tooth 294. This twisting combing action is indicated by the successive arrows 306, 307, 308, 309 and 310. Arrows 309 and 310 show the final combing action in which the twisted blade 166 essentially reaches parallelism with the leading combing surface 304 of the pivot tooth 294.

As shown by the arrow 312 (FIG. 28), the strip with fully twisted blades 166 issues from the continuous motion blade twist station 272 and is fed into the blade fan out positioning operation 198 (FIG. 4).

As shown in FIG. 30, the tube 32 with its integral longitudinal segments 67 and 69 may be initially extruded circular. Thereafter, the tube 32 is ovalized by rolling between a pair of rolls 320 (only one is shown) each having a saddle-shaped elliptical rolling face 322, as seen in cross section. There are clearance grooves 324 and 325 in the rolling face of each roll for accommodating the strip-captivating segments 67 and 69, respectively, to prevent crushing thereof. For simplicity of illustration, the lower half of the tube and the other ovalizing roll is omitted from FIG. 30.

It is to be understood that each of the individual blades 166 and 167 may be shaped into a particular configuration which is most appropriate for a specific application. For example, each of these blades may be stamped into a streamlined airfoil configuration or into a rounded pin or finger-like configuration. Thus, the word "blade" is to be interpreted broadly to include protruding heat-exchange elements having such configurations.

Moreover, where the individual blades have an airfoil, rectangular or similar elongated contour with a major chord, as seen in cross section, the blade may be turned slightly relative to the incident fluid stream to produce a small angle of attack for example in the range up to 12° between the direction of the incident fluid stream and the major chord of the blade. Such an angle of attack may be used to produce a more intensive scrubbing of the fluid along the blade surface for augmenting the transfer of heat from the blade into the moving fluid.

Furthermore, it is to be understood that the incident fluid flow may be at an angle of less than 90° to the longitudinal tube axis 72. For example, the incident fluid flow may be at an angle in the range from 30° to 90° relative to the tubing axis 72, and the major chord of the individual blades will be correspondingly oriented. In cases where the blades are pin-shaped or have finger-like contours, they do not have such major chord to be oriented relative to the fluid flow stream.

While I have described a particular embodiment of the apparatus and method of my invention, it will be understood that variations may be made thereto without departing from the spirit of the invention and the scope of the appended claims.

I claim:

1. The method of fabricating a multiple bladed heat exchange tubing comprising the steps of:
   providing a strip of sheet metal stock;
   shearing each edge of said strip with a plurality of uniformly spaced slits extending inwardly from the edge toward a generally planar, longitudinally extending, unslit, central segment of the strip for forming first and second pluralities of immediately adjacent blades located along opposite sides of said central segment and being integrally attached to said central segment;
   twisting said blades of both pluralities about their own axes near their respective roots for orienting said blades into planes generally normal to said central segment;
   advancing said central segment longitudinally through a forming station for progressively deflecting the sheared and twisted blades of said first and second pluralities toward each other in a direction approximately normal to the original plane of said central segment for forming said central segment with its integrally attached twisted blades into a generally U-shaped configuration as seen looking longitudinally of said central segment;
   further forming said central segment and the roots of said twisted blades into a dovetail configuration as seen looking longitudinally of said segment, said dove-tail configuration having first and second sharp corners extending longitudinally along the opposite sides of said central segment near the respective roots of the blades;
   forming a tube having first and second ridges projecting from the exterior surface of the tube and being integral with the tube, extending parallel and longitudinally thereof;
   positioning said bladed strip with the bottom surface of said central segment in contact with the exterior surface of the tube between said first and second ridges and with said first and second corners of said dovetail configuration being located immediately adjacent to said first and second ridges, respectively; and
   mechanically deforming at least one of said ridges inwardly toward said bladed strip and downwardly in a direction toward the exterior surface of the tube between said ridges for captivating said bladed strip between said ridges with the bottom surface of said central segment being firmly pressed into contact with the exterior surface of the tube between said ridges.

2. The method of claim 1 including the step of supplying a strip of sheet metal stock having a cross-sectional configuration which tapers from a relatively larger thickness at the central segment to a relatively smaller thickness at opposite edges thereof for providing the individual blades in said first and second pluralities of blades with thickness decreasing from their roots to their outer ends.

3. The method of fabricating a multiple bladed heat exchange tubing as claimed in claim 1, in which said positioning said bladed strip with the bottom surface of said central segment in contact with the exterior surface of the tube between said first and second ridges and with said first and second corners of said dovetail configuration being located immediately adjacent to said first and second ridges, respectively is carried out by the further steps of:
   moving said tube with the ridges longitudinally past an insertion wheel whose periphery is aligned with the region between said parallel ridges;
   running said bladed strip partially around said insertion wheel with its periphery engaging against the top surface of said central segment between said first and second plurality of blades; and
   using the periphery of the insertion wheel for pressing the bottom surface of said central segment against the exterior surface of the tube between said ridges.

4. The method of fabricating a multiple bladed heat exchange tubing as claimed in claim 1 or 3, including the further steps of:
   forming said tube with a generally oval shape as seen in cross section, thereby providing a tube having two gently curving arcuate surfaces located on opposite sides of the tube; and
   positioning said first and second parallel ridges projecting outwardly from one of said gently curving arcuate surfaces.

5. The method of fabricating a multiple bladed heat exchange tubing as claimed in claim 4, in which:
   said tube is initially formed with a circular cross section and having said ridges projecting therefrom; and
   thereafter said ridged, circular tube is deformed into said generally oval shape.

6. The method of fabricating a multiple bladed heat exchange tubing as claimed in claim 1 or 3 in which said further forming said central segment and the roots of said twisted blades into a dovetail configuration as seen looking longitudinally of said segment, said dovetail configuration having first and second sharp corners extending longitudinally along the opposite sides of said central segment near the respective roots of the blades includes the step of:
   providing a transverse curvature in the bottom surface of said central segment which is more abruptly curved than the exterior surface of said tube between said parallel ridges; and
   said step of positioning said bladed strip with said bottom surface of said central segment in contact with the exterior surface of the tube between said ridges includes the steps of:
   initially bringing said bottom surface of said central segment into contact with said exterior surface in regions near said two corners of said dovetail with the middle region of said transversely curved central segment being humped up away from said exterior surface; and deforming said humped region down against the exterior tube surface for providing a toggle action for driving said two corners of the dovetail outwardly into tight fitting engagement against the respective ridges.

7. The method of fabricating a multiple bladed heat exchange tubing as claimed in claim 1 or 3, including the step of:
staggering the shearing of the respective edges of said strip for offsetting the uniformly spaced slits in one edge from the uniformly spaced slits in the other edge,
thereby staggering each of the blades of said first plurality on one edge of the strip from the respective blades of said second plurality on the other edge of the strip for providing a staggered orientation of the respective blades with respect to air flow passing the tube in a direction generally normal to the length of the tube.

8. The method of making a heat exchange tube having multiple blades protruding therefrom for use in heat exchanger apparatus including the steps of:
providing a tube having a plurality of pairs of circumferentially spaced parallel ridges protruding outwardly from the exterior surface thereof,
forming a plurality of bladed strips,
each of said bladed strips having a plurality of blades projecting outwardly from and integrally attached to a continuous base segment having a bottom surface and a top surface,
forming the bottom surface of said base segment of the respective bladed strips with a transverse curvature which is more abruptly curved than the exterior surface of said tube between the respective pairs of ridges,
forming said curved bottom surface of the respective bladed strips with a width closely equal to the circumferential spacing between the respective pairs of said ridges,
positioning the base segment of a respective bladed strip against the exterior surface of said tube between a respective pair of said ridges with its bottom surfaces facing toward said exterior surface,
whereby the central region of said base segment will initially hump up away from the exterior surface of the tube, and
mechanically deforming said humped central region of the base segment downwardly against the exterior surface of the tube for providing a toggle action for widening said base segment in a circumferential direction into tight fitting engagement with said pair of ridges for holding said bottom surface of the base segment firmly against the exterior surface of the tube between said ridges.

9. The method of making a heat exchange tube having multiple blades protruding therefrom as claimed in claim 8, in which:
said humped central region of said base segment is mechanically deformed downwardly against the exterior surface of the tube by the periphery of a wheel rolling along the top surface of said humped base segment.

10. The method of making a heat exchange tube having multiple blades protruding therefrom as claimed in claim 8 or 9, in which:
said positioning of the base segment of a respective bladed strip against the exterior surface of said tube between a respective pair of said ridges with its bottom surface facing toward said exterior surface is carried out by the further steps of:
moving said tube longitudinally relative to an insertion wheel whose periphery is aligned with the region between the respective pair of ridges, and
travelling said bladed strip partially around said insertion wheel with its periphery engaging against the top surface of said base segment for such positioning of said base segment between said ridges.

11. The method of making a heat exchange tube having multiple blades protruding therefrom as claimed in claim 10, including the step of:
mechanically deforming said humped central region of said base segment downwardly against the exterior surface of the tube by the insertion wheel.

12. The method of making a heat exchange tube having multiple blades protruding therefrom as claimed in claim 8 or 9, including the further step of:
mechanically deforming at least one of said ridges of said pair inwardly toward said base segment for captivating said base segment between said pair of ridges.

13. The method of making a heat exchange tube having multiple blades protruding therefrom as claimed in claim 8 or 9, including the step of
forming each of said ridges of said pair with an inner surface facing toward the inner surface of the other ridge and said inner surfaces overhanging slightly the exterior surface of said tube between said pair of ridges for tightly gripping said base segment and for pressing the bottom surface of said base segment firmly against said exterior surface when said base segment is widened in a circumferential direction by deforming said humped central region of said base segment.

14. The method of making a heat exchange tube having multiple blades protruding therefrom as claimed in claim 8, including the step of:
running the bottom surface of said base segment longitudinally against a forming wheel having a convex transverse rim curvature, and
simultaneously pressing the two borders of said base segment toward the rim of said forming wheel for forming said bottom surface with said transverse curvature.

15. The method of making a heat exchange tube having multiple blades protruding therefrom including the steps of:
providing a tube having an oval cross-sectional configuration for streamlining the tube with respect to external fluid flow in a direction generally transverse to the length of said tube,
said tube having two gently curving arcuate convex exterior surfaces on opposite sides of said oval shape and having two abruptly curving arcuate convex exterior surfaces at opposite ends of said oval shape,
providing a plurality of pairs of spaced parallel ridges extending longitudinally along the tube and protruding from both of said gently curving exterior surfaces of the tube,
forming a plurality of bladed strips each having a plurality of blades protruding outwardly from and integrally attached to a continuous base segment,
positioning the base segments of the respective bladed strips between the respective pairs of ridges on both of said gently curving exterior surfaces of the tube, and captivating each of said positioned base segments between the respective pairs of ridges with said base segments in firm contact with the respective gently curved exterior surfaces of the tube for providing good heat conduction between the tube and the base segment of each strip and with the blades fanning out on opposite sides of the oval-shaped tube for being positioned in the two regions of relatively unimpeded external fluid flow.

* * * * *